United States Patent
Lelowicz et al.

(10) Patent No.: US 12,430,800 B2
(45) Date of Patent: Sep. 30, 2025

(54) METHODS AND SYSTEMS FOR DETERMINING PRE-DETERMINED POINTS IN AN INPUT IMAGE

(71) Applicant: Aptiv Technologies AG, Schaffhausen (CH)

(72) Inventors: Kamil Lelowicz, Bogunice (PL); Mariusz Nowak, Katowice (PL)

(73) Assignee: Aptiv Technologies AG, Schaffhausen (CH)

( * ) Notice: Subject to any disclaimer, the term of this patent is extended or adjusted under 35 U.S.C. 154(b) by 598 days.

(21) Appl. No.: 17/659,054

(22) Filed: Apr. 13, 2022

(65) Prior Publication Data

US 2022/0335651 A1 Oct. 20, 2022

(30) Foreign Application Priority Data

Apr. 15, 2021 (EP) .................................. 21168656

(51) Int. Cl.
*G06T 7/80* (2017.01)
*G06T 7/13* (2017.01)

(52) U.S. Cl.
CPC .......... *G06T 7/80* (2017.01); *G06T 7/13* (2017.01); *G06T 2207/20081* (2013.01); *G06T 2207/20084* (2013.01)

(58) Field of Classification Search
CPC ... G06T 7/80; G06T 7/13; G06T 2207/20081; G06T 2207/20084; G06T 2207/20021; G06T 2207/30208; G06T 7/73; G06T 7/85; G06T 2207/30244; G06N 3/08
See application file for complete search history.

(56) References Cited

U.S. PATENT DOCUMENTS

| | | | |
|---|---|---|---|
| 9,064,315 B2 * | 6/2015 | Meyers | G06T 5/90 |
| 10,334,229 B2 * | 6/2019 | Vandame | H04N 17/002 |
| 2014/0119651 A1 * | 5/2014 | Meyers | G06T 5/90 |
| | | | 382/167 |
| 2016/0337632 A1 * | 11/2016 | Vandame | H04N 25/61 |

(Continued)

FOREIGN PATENT DOCUMENTS

| | | | | |
|---|---|---|---|---|
| CN | 111105466 | | 5/2020 | |
| CN | 111640157 | | 9/2020 | |
| CN | 111640157 A | * | 9/2020 | G06T 5/009 |

OTHER PUBLICATIONS

Mao Yang, Xiaobo Chen, and Chengyi Yu, "Camera calibration using a planar target with pure translation," Appl. Opt. 58, 8362-8370 (2019) (Year: 2019).*

(Continued)

*Primary Examiner* — Bobbak Safaipour
(74) *Attorney, Agent, or Firm* — Harness, Dickey & Pierce, P.L.C.

(57) ABSTRACT

The present disclosure describes systems and techniques of using an algorithm to identify saddle points in camera calibration patterns. In implementations, the algorithm is a machine-learning model. In aspects, a computer-implemented method for determining pre-determined points in an input image includes applying a plurality of shifts to an input image to obtain a plurality of shifted images, detecting pre-determined points in each of the shifted images, re-shifting the detected pre-determined points, and determining the pre-determined points based on the re-shifted detected pre-determined points.

10 Claims, 5 Drawing Sheets

(56) References Cited

U.S. PATENT DOCUMENTS

2022/0180491 A1* 6/2022 Shinohara ............. G03B 37/00
2022/0335650 A1 10/2022 Lelowicz et al.

OTHER PUBLICATIONS

"Chen": B. Chen, Y. Liu and C. Xiong, "Automatic Checkerboard Detection for Robust Camera Calibration," 2021 IEEE International Conference on Multimedia and Expo (ICME), Shenzhen, China, 2021, pp. 1-6, doi: 10.1109/ICME51207.2021.9428389. (Year: 2021).*
"Pursuant to MPEP § 2001.6(b) the applicant brings the following co-pending application to the Examiner's attention: U.S. Appl. No. 17/659,301."
"Extended European Search Report", EP Application No. 21168669.6, Oct. 7, 2021, 12 pages.
"Extended European Search Report", EP Application No. 21168656.3, Oct. 12, 2021, 15 pages.
Donne, et al., "MATE: Machine Learning for Adaptive Calibration Template Detection", Nov. 2016, 16 pages.
Fernandez, et al., "Fast and Robust Multiple ColorChecker Detection using Deep Convolutional Neural Networks", Oct. 2018, 10 pages.
Raza, et al., "Artificial Intelligence Based Camera Calibration", Jun. 24, 2019, pp. 1564-1569.
Yang, et al., "Precise Measurement of Position and Attitude Based on Convolutional Neural Network and Visual Correspondence Relationship", Jun. 2020, 12 pages.

* cited by examiner

METHODS AND SYSTEMS FOR DETERMINING PRE-DETERMINED POINTS IN AN INPUT IMAGE

CROSS-REFERENCE TO RELATED APPLICATION(S)

This application claims priority to European Patent Application Number 21168656.3, filed Apr. 15, 2022, the disclosure of which is hereby incorporated by reference in its entirety herein.

BACKGROUND

Digital imaging devices, such as digital cameras, are used in automotive applications for a variety of tasks. However, it may be required to properly calibrate the digital imaging device. Accordingly, there is a need to provide efficient and reliable methods for camera calibration.

SUMMARY

The present disclosure provides a computer-implemented method, a computer system and a non-transitory computer readable medium according to the independent claims. Implementations are given in the subclaims, the description and the drawings.

In an aspect, the present disclosure is directed at a computer-implemented method for determining pre-determined points in an input image, the method comprising the following steps performed (e.g., carried out) by computer hardware components: applying a plurality of shifts to the input image to obtain a plurality of shifted images; detecting pre-determined points in each of the shifted images; re-shifting the detected pre-determined points; and determining the pre-determined points based on the re-shifted detected pre-determined points.

For example, detection may be carried out on shifted images, and the detections may be shifted back (e.g., re-shifted) to the original coordinates, so that the pre-determined points are determined based on the re-shifted detections. In an additional example, one of the shifts may be zero, so that the one shifted image may be an original image.

According to an implementation, detecting the pre-determined points may comprise determining coordinates (of the pre-determined points in the shifted images). According to an additional implementation, re-shifting may comprise shifting the coordinates to a coordinate system of the input image. According to a further implementation, detecting the pre-determined points may comprise determining probabilities (of a pre-determined point being present at the respective determined coordinates). According to a further implementation, determining the pre-determined points based on the re-shifted detected pre-determined points may comprise accumulating the probabilities of the re-shifted detected pre-determined points.

According to an additional implementation, the input image may be divided into a plurality of cells. Each cell may be a rectangular sub-portion of the input image. In some cases, some cells may have identical size. In additional cases, some cells may have different sizes. Further, the cells may be overlapping or non-overlapping.

According to an implementation, the shifted images may be shifted by at least one of at least substantially 1% of a size of the cell, or by at least one of at least substantially 2% of the size of the cell, or by at least one of at least substantially 5% of the size of the cell, or by at least one of at least substantially 10% of the size of the cell.

For example, the cell size may be 8×8 (e.g., 8 pixels wide, 8 pixels high). The shifts may be an input parameter to the method. The shift may be an integer number (e.g., positive, negative). Further, the absolute value of a shift may be less than a cell size. In implementations, the method may be executed in parallel, so that several shifts may be set at the same time. For example, the shifts may be selected from a list consisting of: [−6, −4, −2, 0, 2, 4, 6], and the outcome from all the shifts may be merged and utilized concurrently.

The shift may be carried out in two components, such as vertically and horizontally. For example, the length of the vertical shift may be identical to the length of the horizontal shift (e.g., so that a diagonal shift may be provided).

According to an implementation, the input image may comprises (e.g., shows, includes) a checkerboard. According to an additional implementation, the pre-determined points may comprise saddle points of the checkerboard. According to a further implementation, saddle points may be crossings of black-white borders of the checkerboard. According to a further implementation, the pre-determined points in each of the shifted images may be determined using a machine learning method. According to a further implementation, the machine learning method may comprise an artificial neural network.

In another aspect, the present disclosure is directed at a computer system. The computer system may comprise a plurality of computer hardware components configured to carry out several or all steps of the computer-implemented method described herein.

The computer system may comprise a plurality of computer hardware components (e.g., a processor, a processing unit or processing network, at least one memory, a memory unit or memory network, and at least one non-transitory data storage). Additional computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example using the processing unit and the at least one memory unit.

According to an implementation, the computer system may further comprise a camera configured to acquire the image.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein. In aspects, systems and techniques are described herein for using an algorithm (e.g., a machine-learning model) to identify saddle points in camera calibration patterns.

BRIEF DESCRIPTION OF THE DRAWINGS

Example implementations and functions of the present disclosure are described herein in conjunction with the following drawings.

DETAILED DESCRIPTION

According to various implementations, a non-maximum suppression method for saddle points detectors may be provided.

Saddle points on a picture (e.g., image) may be one of the most characteristic features that can be extracted from the picture.

Saddle points may be widely used for intrinsic calibration of a camera, for extrinsic calibration of the camera, and/or for matching characteristic points.

Figure 1A:
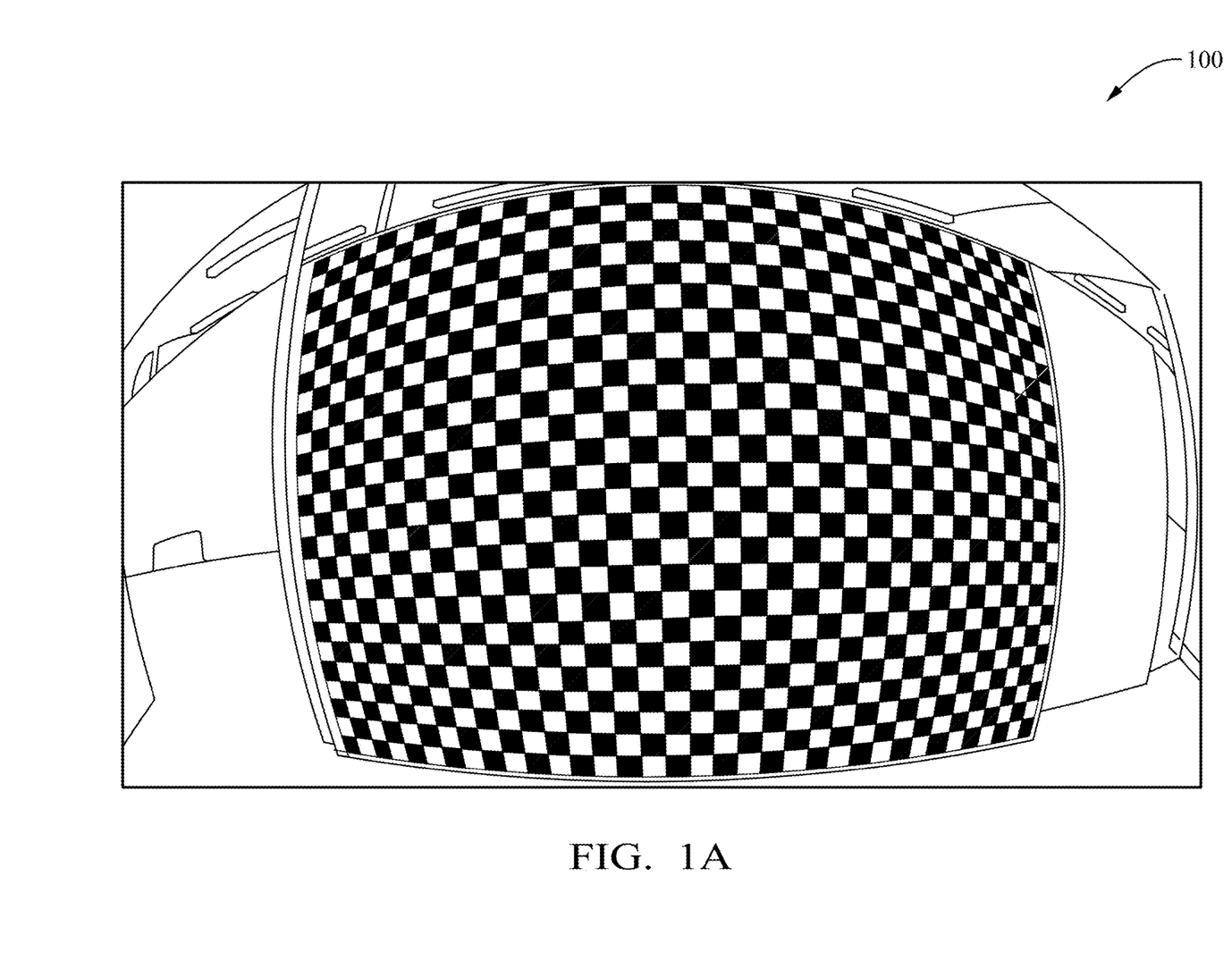
FIG. 1A illustrates an example of input data.

FIG. 1A shows an illustration 100 of an example of input data (e.g., an input image). As illustrated, the image shows a checkerboard. Further illustrated, distortion may appear large in the picture.

Figure 1B:
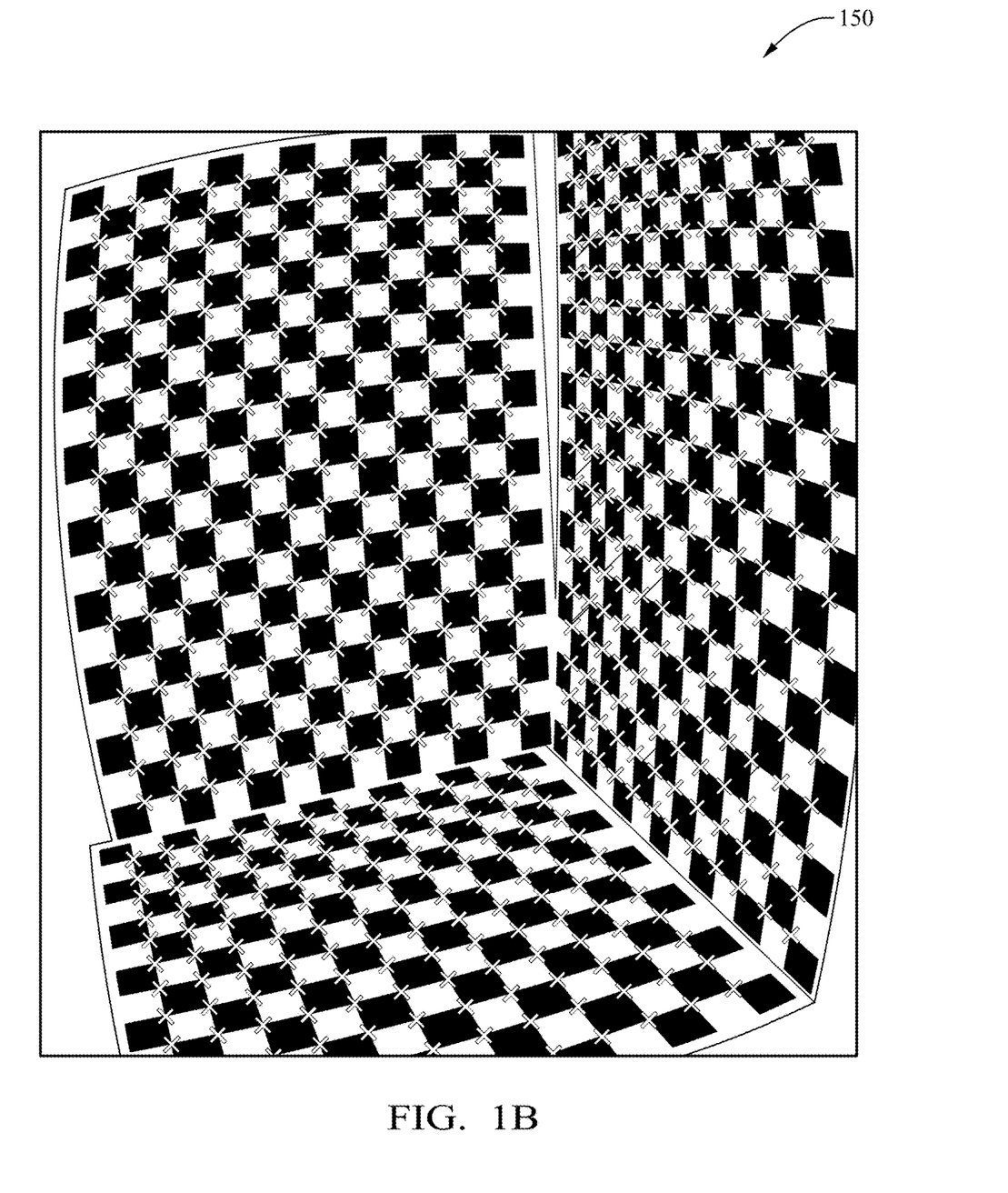
FIG. 1B illustrates a further example of input data.

FIG. 1B shows an illustration 150 of a further example of input data. As illustrated, checkerboards may be provided in more than one plane.

Figure 2:
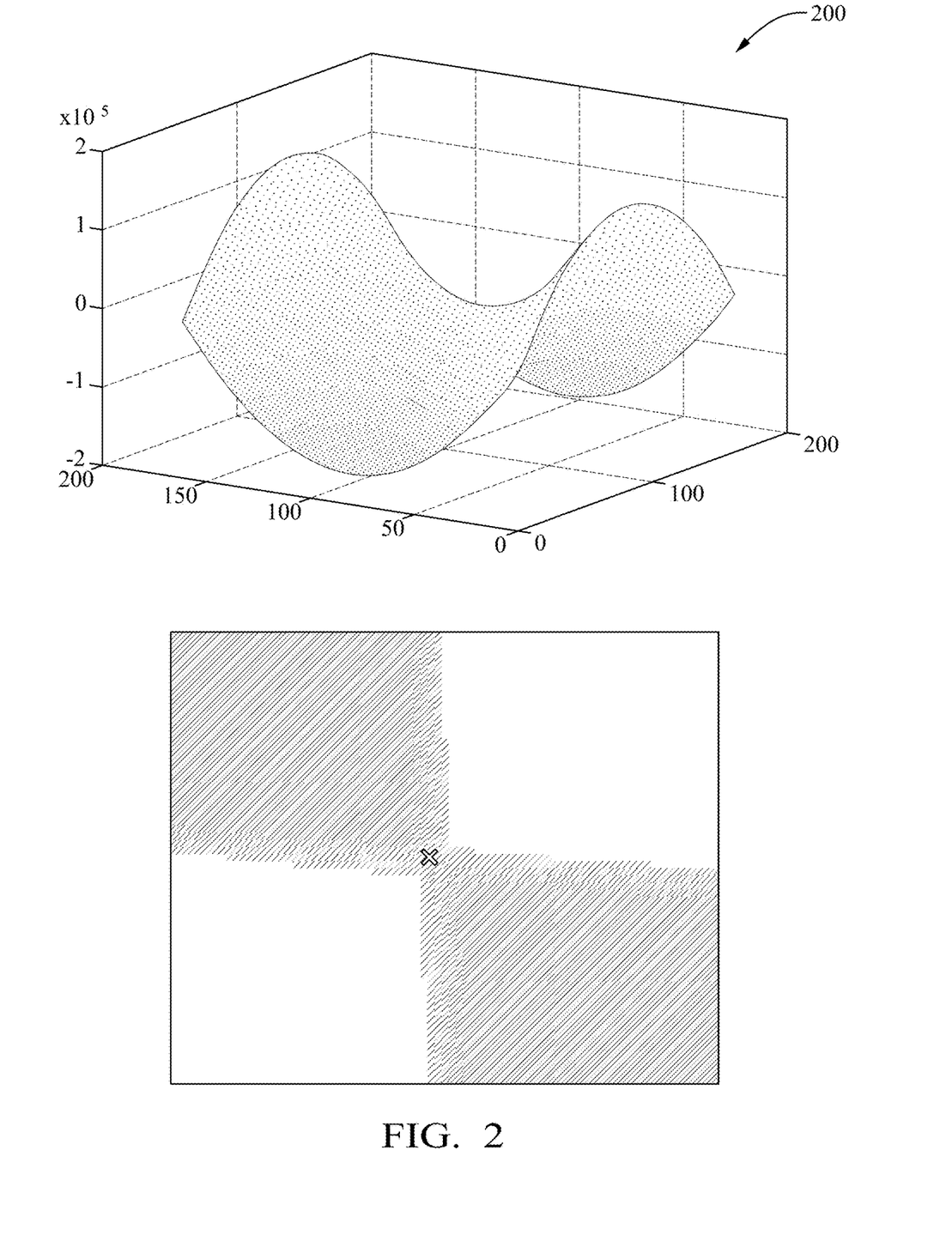
FIG. 2 illustrates saddle point examples.

FIG. 2 shows an illustration 200 of saddle point examples. In a top portion of FIG. 2, the pixel values are shown over the pixel coordinates. The image is illustrated in a bottom portion of FIG. 2, and the saddle point is at the crossing between the borders between dark areas and light areas.

The accuracy of finding saddle points may have critical impact on a quality of camera calibration. Further, it may be desired to detect all the saddle points, since not detecting a saddle point may lead to serious problems in the later stages of a calibration procedure (e.g., related to problems with matching the saddle points and their predicted location).

In a method relying on fixed size regions of interest to detect and locate saddle points, problems may arise when a saddle point is located on the border between two or more regions of interest. Such a location of a saddle point frequently leads to a situation in which the particular saddle point is associated with neither of the regions of interest and, consequently, is not detected. According to various implementations, the recall of the saddle points located on the borders between regions of interest may be increased.

According to various implementations, a method of non-maximum suppression may be provided which may increase recall of saddle points by a neural network. A non-maximum suppression (NMS) method may ensure that not more than one pixel (or one location, which may be of sub-pixel resolution) is identified as a maximum, even in an image it may appear that a plurality of pixels take a maximum value.

A standard NMS method may require matching "all with all", which may lead to a $O(n^2)$ time complexity, wherein 'n' is the width (or the height) of the image. In contrast thereto, according to various implementations, by leveraging the grid structure, an $O(n)$ time complexity may be achieved.

According to various implementations, use vectorization techniques (e.g., single instruction, multiple data (SIMD) instructions) may be used to gain even more speed. In addition, the calculation on grid structure with independent cells may be easily ported to a graphics processing unit (GPU). As a result, while the main method (which may be referred to as core) may be running on the GPU, the NMS may also be executed on the GPU without sending data back to the central processing unit (CPU). Exchanging data between CPU and GPU may be time consuming. According to various implementations, the transmission volume between the CPU and the GPU may be minimized.

In an example, when a saddle point appears very close to the edge or corner of a cell, it is often not detected. According to various implementations, this problem may be overcome by passing the image through the neural network several times. Each time of passing the image through the neural network, the frame may be positioned differently so that the upper left corner of the image (e.g., photo) is shifted from its original position.

This method may cause the saddle points that were close to the border of the cells to be moved away from the border. However, this approach may require the use of the non-maximum suppressive method (NMS), as most saddle points may be repeatedly detected. However, NMS methods are computationally time-consuming.

According to various implementations, this problem may be overcome by using the grid structure to leverage the speed of the method execution. Outputs from different runs, which are with different offsets to each other, may be aligned so that they return values in one reference system. Consequently, for each cell, the final location of the saddle point position in the cell may be independently calculated in parallel using a weighted average, where the weight is determined by the probability of the point's existence.

Figure 3A:
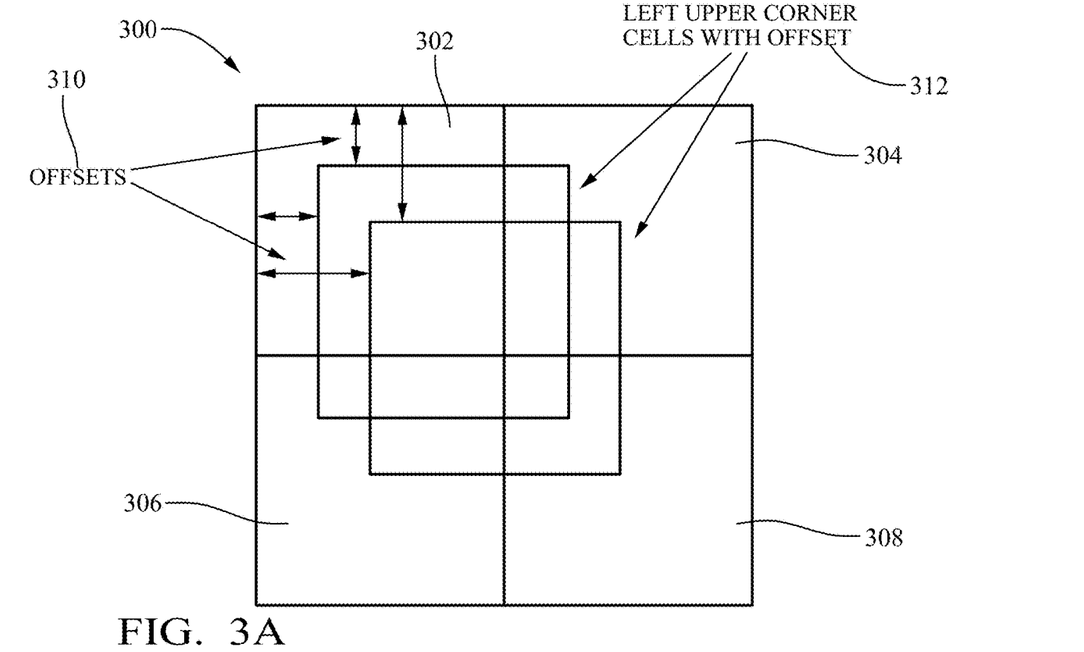
FIG. 3A illustrates input data shifting according to various implementations.

FIG. 3 shows an illustration 300 of input data shifting according to various implementations. An input image may, for example, be divided into a plurality of cells, including four cells 302, 304, 306, and 308. For example, the first cell 302 may be the left upper corner cell. Detection of saddle points may be carried out for a plurality of shifted images (e.g., shifted cells). For example, for the first cell 302, shifts 310 may be applied, so as to generate a plurality of shifted cells 312 corresponding to the first cell 302.

Figure 3B:
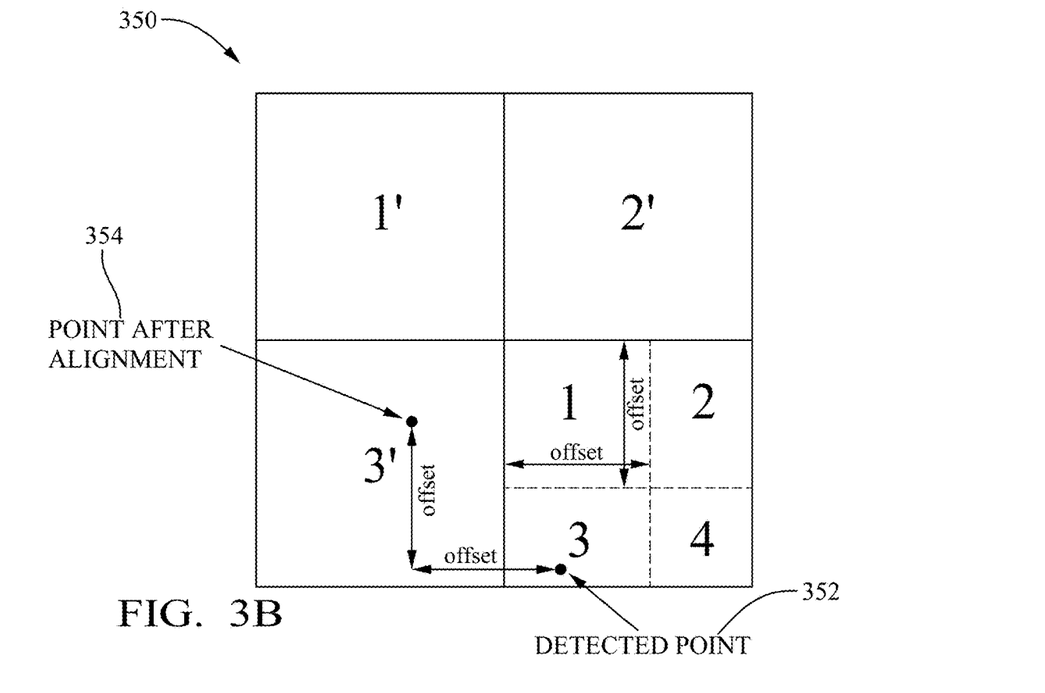
FIG. 3B illustrates the alignment according to various implementations.

FIG. 3B shows an illustration 350 of the alignment according to various implementations. The alignment process may be illustrated by examining how a saddle point is moved during the alignment.

For example, the saddle point 352 (e.g., a detected saddle point) may be located in the lower-right cell (e.g., the one divided in the subregions denoted 1, 2, 3 and 4). Further, the shift may be equal to the offset shown in FIG. 3B.

In addition, the saddle point lies in one of the four subregions, and the point 354 after alignment may be in the same region or in a different region:

If the point is inside region 1, then after alignment it may be moved to cell 1'. The position in cell 1' after alignment may be calculated based on the given offset (e.g., but in opposite directions). The same may apply to the subregions 2 and 3. For subregion 4, the detected point may still be in the same cell (the lower-right cell), and only the position may be affected by the offset.

In highly distorted regions of an image, the saddle points may be stretched, so that their sizes may be bigger than the cell size. In such case, when the center of the saddle point is far from the center of the cell, it may be difficult for the saddle point detector to produce a correct output. While commonly used methods may miss saddle points, the method according to various implementations may properly detect all saddle points.

The method according to various implementations may be fast and may improve recall from 98% to 99.9%. Further, it may operate with a decreased the number of missed saddle points over 20 times.

Ground truth (GT) data may be created in a semi-automatic way. The results obtained from a "standard detector" may be manually corrected. False positive detections may be removed and missing detections may be added. A problem may be that it may be hard to judge where exactly a saddle point is located. Creating a ground truth, a saddle point position may only be estimated within +−1px accuracy. The prediction may be treated as a true positive (TP) when it is less than two pixels from the GT. In this case, recall may be defined as number of TPs divided by all GT on/in the input image.

As described above, it may be hard to evaluate "location error" of predictions. The locations of saddle points may be used in camera intrinsic calibration. Thus, two sets of detected saddle points on the same image may be compared by checking how well the camera was calibrated. For example, for which set of saddle points the residual of the camera calibration (e.g., model optimization) is smaller.

Figure 4:
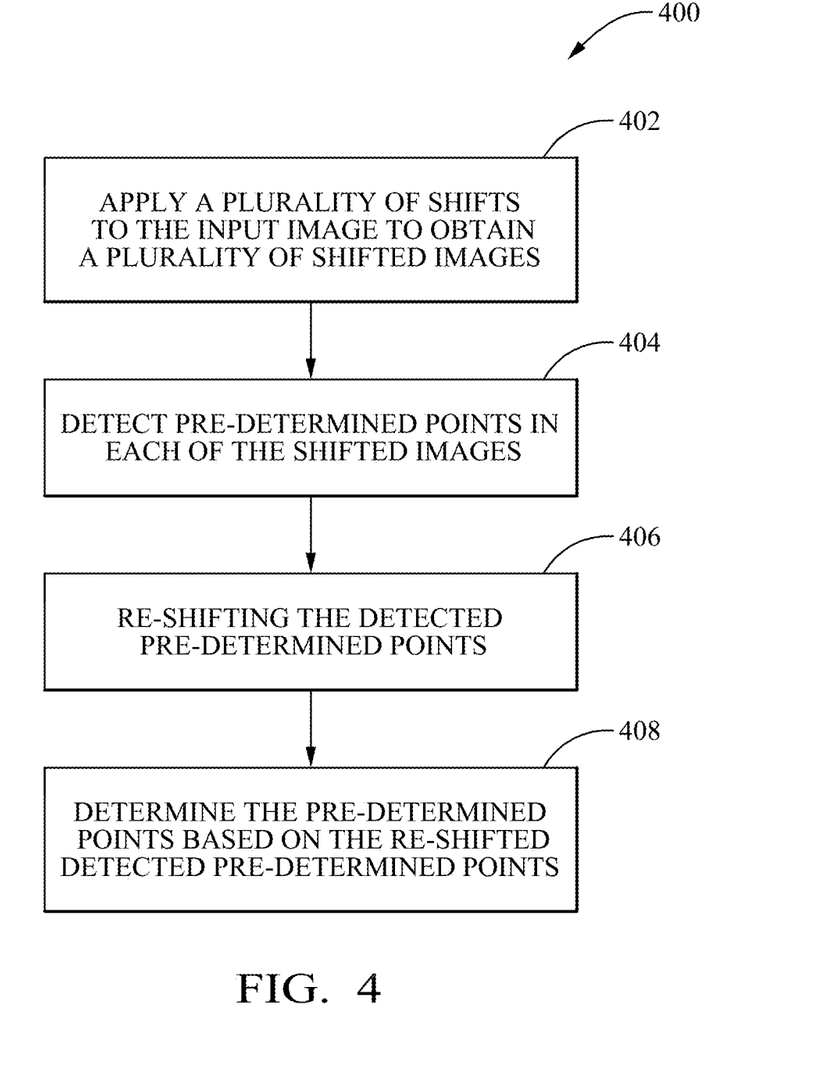
FIG. 4 illustrates a method for determining pre-determined points in an input image according to various implementations.

FIG. 4 shows a flow diagram 400 illustrating a method for determining pre-determined points in an input image according to various implementations. At 402, a plurality of shifts may be applied to the input image to obtain a plurality of shifted images. At 404, pre-determined points may be detected in each of the shifted images. At 406, the detected pre-determined points may be re-shifted. At 408, the pre-determined points may be determined based on the re-shifted detected pre-determined points.

According to various implementations, detecting the pre-determined points may include or may be determining coordinates. According to various implementations, the re-shifting may include or may be shifting the coordinates to a coordinate system of the input image. According to various implementations, detecting the pre-determined points may include or may be determining probabilities. According to various implementations, determining the pre-determined points based on the re-shifted detected pre-determined points may include or may be accumulating the probabilities of the re-shifted detected pre-determined points. According to various implementations, the input image may be divided into a plurality of cells. According to various implementations, the shifted images may be shifted by at least one of at least substantially 1% of a size of the cell, or by at least one of at least substantially 2% of the size of the cell, or by at least one of at least substantially 5% of the size of the cell, or by at least one of at least substantially 10% of the size of the cell. According to various implementations, the image may include or may show a checkerboard.

According to various implementations, the pre-determined points may include or may be saddle points of the checkerboard. According to various implementations, saddle points may be crossings of black-white borders of the checkerboard. According to various implementations, the pre-determined points in each of the shifted images may be determined using a machine learning method. According to various implementations, the machine learning method may include or may be an artificial neural network.

In further aspects, each of the steps 402, 404, 406, and 408 and the further steps described above may be performed by computer hardware components.

What is claimed is:

1. A computer-implemented method comprising:
applying a plurality of shifts to an input image to obtain a plurality of shifted images;
detecting pre-determined points in each of the shifted images;
re-shifting the detected pre-determined points; and
determining the pre-determined points based on the re-shifted detected pre-determined points;
wherein detecting the pre-determined points comprises determining coordinates;
wherein the re-shifting comprises shifting the coordinates to a coordinate system of the input image;
wherein detecting the pre-determined points comprises determining probabilities of a pre-determined point being present at the respective determined coordinates;
wherein determining the pre-determined points based on the re-shifted detected pre-determined points comprises accumulating the probabilities of the re-shifted detected pre-determined points;
wherein the image comprises a checkerboard and the pre-determined points comprise saddle points of the checkerboard; and
wherein the pre-determined points in each of the shifted images are determined using a machine learning method.

2. The computer-implemented method of at least one of claim 1, wherein the input image is divided into a plurality of cells.

3. The computer-implemented method of at least one of claim 1, wherein
the shifted images are shifted by at least one of at least substantially 1% of a size of a cell of the input image, or by at least one of at least substantially 2% of the size of the cell, or by at least one of at least substantially 5% of the size of the cell, or by at least one of at least substantially 10% of the size of the cell.

4. The computer-implemented method of claim 1, wherein the saddle points are crossings of black-white borders of the checkerboard.

5. The computer-implemented method of claim 1, wherein the machine learning method comprises an artificial neural network.

6. A computer system comprising:
one or more processors; and
a memory coupled to the one or more processors, the memory storing one or more programs configured to be executed by the one or more processors, the one or more programs including instructions for:
applying a plurality of shifts to an input image to obtain a plurality of shifted images;
detecting pre-determined points in each of the shifted images;
re-shifting the detected pre-determined points; and
determining the pre-determined points based on the re-shifted detected pre-determined points;
wherein detecting the pre-determined points comprises determining coordinates;
wherein the re-shifting comprises shifting the coordinates to a coordinate system of the input image;
wherein detecting the pre-determined points comprises determining probabilities of a pre-determined point being present at the respective determined coordinates;
wherein determining the pre-determined points based on the re-shifted detected pre-determined points comprises accumulating the probabilities of the re-shifted detected pre-determined points;

wherein the image comprises a checkerboard and the pre-determined points comprise saddle points of the checkerboard; and wherein the pre-determined points in each of the shifted images are determined using a machine learning method.

7. The computer system of claim 6, further comprising a camera, the camera configured to acquire the input image.

8. The computer system of claim 6, wherein the saddle points are crossings of black-white borders of the checkerboard.

9. A non-transitory computer-readable storage medium storing one or more programs, the one or more programs comprising instructions, which when executed by a processor, cause the processor to:

apply a plurality of shifts to an input image to obtain a plurality of shifted images;

detect pre-determined points in each of the shifted images;

re-shift the detected pre-determined points; and determine the pre-determined points based on the re-shifted detected pre-determined points;

wherein detecting the pre-determined points comprises determining coordinates;

wherein the re-shifting comprises shifting the coordinates to a coordinate system of the input image;

wherein detecting the pre-determined points comprises determining probabilities of a pre-determined point being present at the respective determined coordinates;

wherein determining the pre-determined points based on the re-shifted detected pre-determined points comprises accumulating the probabilities of the re-shifted detected pre-determined points;

wherein the image comprises a checkerboard and the pre-determined points comprise saddle points of the checkerboard; and wherein the non-transitory computer-readable storage medium further comprises:

a machine learning model, the machine learning model configured to determine the pre-determined points in each of the shifted images.

10. The non-transitory computer-readable storage medium of claim 9, wherein the machine learning method comprises an artificial neural network.

* * * * *